US006597381B1

(12) United States Patent
Eskridge et al.

(10) Patent No.: US 6,597,381 B1
(45) Date of Patent: Jul. 22, 2003

(54) USER INTERFACE FOR AUTOMATED OPTICAL INSPECTION SYSTEMS

(75) Inventors: Thomas C. Eskridge, Austin, TX (US); Jeff E. Newberry, Pflugerville, TX (US); Mark R. DeYong, Round Rock, TX (US); Scott A. Dunn, Austin, TX (US); Wesley K. Huffstutter, Austin, TX (US); John W. Grace, Austin, TX (US); Marc A. Lumeyer, Cedar Park, TX (US); Michael A. Ellison, Austin, TX (US); John R. Zoch, Austin, TX (US)

(73) Assignee: Intelligent Reasoning Systems, Inc., Austin, TX (US)

( * ) Notice: Subject to any disclaimer, the term of this patent is extended or adjusted under 35 U.S.C. 154(b) by 0 days.

(21) Appl. No.: 09/360,854

(22) Filed: Jul. 24, 1999

(51) Int. Cl.[7] ................................................. G09G 5/00
(52) U.S. Cl. ...................... 345/804; 345/771; 382/145; 382/147; 382/148; 382/149; 707/110; 707/121
(58) Field of Search ................................. 345/764, 765, 345/771, 781, 804; 382/149, 141, 145, 147, 148, 150; 700/95, 96, 108, 109, 110, 121

(56) References Cited

U.S. PATENT DOCUMENTS 5,963,314 A * 10/1999 Worster et al. .......... 356/237.2
6,292,582 B1 * 9/2001 Lin et al. .................... 382/149
6,324,298 B1 * 11/2001 O'Dell et al. ............... 382/149

FOREIGN PATENT DOCUMENTS

WO      WO 99/14655    3/1999      ............. G06F/3/00
WO      WO 99/16010    4/1999      ............. G06K/9/00

OTHER PUBLICATIONS

Di Mauro, E. C., "Check! A Generic and Specific Industrial Inspection Tool", IEE Proceedings: Vision, Image and Signal Processing, (Aug. 1996), vol. 143, No. 4.

* cited by examiner

Primary Examiner—Ba Huynh
(74) Attorney, Agent, or Firm—Gray Cary Ware & Freidenrich, LLP

(57) ABSTRACT

A user interface method and system are disclosed that allow for user selection on a display device of one or more functions performed via a computer in an automated optical inspection system. The user interface provides a real-time information display that makes apparent critical board inspection information and potential undesirable operating conditions so that corrective action can be rapidly initiated. The user interface includes one or more button icons respectively associated with the user selectable functions and at least one view area window for displaying information items. The information items displayed in a view window can be dynamically linked to provide interactivity between windows and simultaneous updating of related information items in all windows. A filter area window is used for selecting which information items to discriminate and display in the view windows. The user interface of the present invention can be a graphical user interface having view windows in which either text, graphics or both are displayed simultaneously.

79 Claims, 2 Drawing Sheets

USER INTERFACE FOR AUTOMATED OPTICAL INSPECTION SYSTEMS

TECHNICAL FIELD OF THE INVENTION

This invention relates generally to user interfaces for computer systems and, more particularly, to a user interface system and method for automated optical inspection systems.

BACKGROUND OF THE INVENTION

The current generation of computer vision systems and, more specifically, computer vision systems used for automated optical inspection ("AOI"), place a significant burden on the operators of these systems to develop programs that will enable the system to classify an image into one or more disjoint or non-disjoint classes. Because of this, the user interface elements associated with these systems present to their users options for programming or modifying the system's existing program. This makes current AOI systems exceedingly difficult to use. To increase ease of use, such systems incorporate a graphical user interface ("GUI"— pronounced "gooey"). GUIs have become more prevalent in such systems with the increasingly widespread availability of powerful microprocessors.

A GUI is a type of display format that enables a user to operate a computer controlled system by pointing to pictorial representations, such as "windows" and "icons" (bitmaps), on a display device. A window is a rectangle displayed on a screen that affords a user workspace within a program. In a typical operation, the user may move the window about on the screen, change its size or shape, enlarge it to fill the screen, close it entirely, or change how much of its contents are displayed. To aid the user in the manipulation of its contents, a window will typically include a number of user interface components, such as buttons, menus, sliders, and the like. Outside the window, the screen can display other screen objects, such as other windows, or related computer system representations, such as disk drive icons or toolbars.

To navigate within a GUI, most systems employ a screen cursor or pointer, typically displayed as a small arrow icon (bitmap) which allows the user to select individual points on the screen. In operation, the screen cursor is moved to a desired screen location in response to the movement of a pointing device (e.g., a mouse) by the user. Besides effecting cursor movement, most pointing devices include one or more switches or "mouse buttons" for specifying additional user input or "user events" by "clicking" on (selecting) objects in the display device. Since many user choices may be entered through use of a pointing device (e.g., for selecting screen objects), instead of input with the keyboard, the need for the user to memorize special commands is lessened.

GUIs feature a menu bar, for instance, running across the top of the screen which serves to group or categorize commands available to the user. Clicking on an item on the menu bar typically causes a "pulldown menu" to appear. This second or "sub-menu" also includes a number of items, each of which is associated with a desired action, including the display of even more menus. To select a desired action, the user usually clicks the corresponding menu item with the screen or mouse pointer. For some menu items, particularly those which may be nested in several layers deep, a keyboard equivalent or "hotkey" may be available. The conventional graphical user interface described above significantly reduces the amount of information that a user must recall in order to effectively use the computer controlled system.

Current AOI systems incorporate graphical user interfaces for system users to interact with and modify the AOI program. However, current graphical user interfaces for AOI systems present information in a static manner to the user and the user cannot (or finds it difficult to) interact with or explore the data presented in greater depth. The information displayed to the user by the GUI in current AOI systems is generally not linked to other pieces of information on the same interface in a way that the user can manipulate the information to get still more information. For example, the user cannot filter the data or provide information to the system via the GUI.

One existing method for modifying an AOI program is through the use of automated threshold modification functions. These functions modify the behavior of an AOI system program by analyzing the AOI algorithm performance with different threshold values with respect to a set of test images. However, this method is merely an extension of the basic AOI programming methodology and, as such, still has the same efficiency and effectiveness problems normally associated with those systems. The operator is using a programming tool rather than a user interface tool and is imparting programming information rather than information that can be used to distinguish between possible class memberships of the image under inspection.

Current user interfaces, therefore, do not allow information to be imparted to the AOI system through the interacting behavior with the information displayed in the user interface. The control elements in such a graphical user interface cannot be manipulated and simultaneously updated because they are not linked in the underlying programming. Current AOI system GUIs only display information to the operator/ user, but the user cannot make queries or organize the information for viewing in different ways. Additionally, by virtue of not being able to interact with the system, the user cannot increase the performance of the AOI system by imparting information learned about the production process back to the AOI system.

As a result, currently existing AOI system GUIs do not provide the user the capability to fine tune and troubleshoot false calls and defect occurrences for diagnosing a problem on the line. For example, in order to reduce the scope of a specific inspection algorithm of the AOI system, current systems require the modification of the algorithm for the entire component class(es) the algorithm looks at, instead of allowing a component-by-component basis modification. The user is therefore unable to go into the system and very quickly determine what process areas may be suspicious. Heavy reliance on process engineers is thus required in prior art AOI systems lacking a more interactive user interface.

Similarly, prior art AOI system GUIs do not provide the capability to filter defect classifications by different parameters (for example decision confidence values) that are linked in such a way as to allow narrowing of the data presented to point to a specific line problem or defect. A user of such a prior art system cannot easily determine and corroborate the reliability of classification decisions made by the system. Additionally, using current AOI system GUIs, a user cannot compare a current board defect to, for example, a prior closest example of that defect. Such a comparison allows a user to quickly and with more confidence conceptualize the decision as to whether a defect has been correctly classified. Such a comparison further provides for increased confidence in the continuity of interpretation of defects between different users. By comparing the image of a current defective board to images of prior boards and defects and, more particularly, to the closest identified defect to the current board, the user can perform a selection task instead of a recognition task. The user is thus not forced to look at an image and determine the existence of a defect without a basis for comparison. Instead, the user decides whether the current board defect is similar to a prior detected defect of high-confidence.

Presently existing AOI system GUIs also do not give a user the capability to impart user corroboration of process performance back to a system capable of learning. In this regard, we make reference to pending related U.S. patent application Ser. No. 09/935,531, filed on Sep. 22, 1997, which discloses an AOI algorithm capable of learning through both automated and manual input as to the confidence level to impart to a detected defect. If an AOI system had the underlying capability to learn from user input, current graphical user interfaces do not allow for real-time training of the AOI system because they do not provide the capability for a user to easily impart knowledge to the system.

In particular, prior art systems do not allow the user to impart information to the system in such a way that the system learns and assigns reliable confidence values to defects as they occur, i.e., the user cannot update the system knowledge-base on a real-time basis. As a result, current AOI systems defect recognition cannot be improved in real time to more reliably recognize subsequent defects or to treat subsequent defects in a particular manner. Relatedly, particular types of defects cannot be tracked to determine when they change, or to ignore them in certain cases. This capability is useful, for example, when using equivalent alternate parts from different manufacturers.

Initial training of an AOI system via a graphical user interface is also currently a non-trivial process. Graphical user interfaces on current AOI systems do not have an easy-to-learn and easy-to-use process for a user to initially train the AOI system in defect recognition. Thus, the underlying learning of the present invention provides the capability to use an extremely simple ("wizard") interface to train the system. In contrast, prior art systems cannot because the underlying systems are incapable of learning (i.e., require programming). Additionally, prior art systems do not provide the ability to control access to sensitive menu settings.

SUMMARY OF THE INVENTION

Therefore a need has arisen for a user interface for an automated optical inspection system that is both easy to use and provides the operator with the capability to impart information back into the automated optical inspection system.

A further need exists for an automated optical inspection system user interface that dynamically links the information items displayed within different areas of the user interface such that a user can interact within one view area and simultaneously link to and/or update the corresponding information items in another view area.

A still further need exists for an AOI system user interface having the capability to discriminate ("filter") the type and amount of information displayed in the view areas of the user interface.

An even further need exists for an AOI system user interface that allows the user to train the AOI system in real-time, and without interruption of the inspection process, to increase the confidence level in the defect detection capability of the AOI system and to improve the AOI system's identification and classification of defects.

Yet a further need exists for an AOI system user interface that allows the user to troubleshoot the AOI system process to determine the source of false calls and defect occurrences in the process without having to modify the entire inspection algorithm for the entire component class.

Further still, a need exists for an AOI system user interface with the capability to present to the user a side-by-side visual comparison of a currently detected board defect and a closest high-confidence defect match, or a visual example of what the component should look like, from the AOI systems knowledge-base to provide for a rapid and more reliable determination of the existence of a defect by a user.

A still further need exists for an AOI system user interface having the capability for a user to quickly and accurately determine the source of process errors, thereby allowing economically feasible small production runs of different boards and/or components without the heavy reliance on highly experienced process engineers (as in prior art such systems).

Even further, a need exists for an AOI system user interface that provides access controls to protect sensitive menu items.

In accordance with the present invention, an AOI user interface is provided that substantially reduces or eliminates the disadvantages and problems associated with previously developed AOI user interfaces, including the problems of extensive reliance on process engineers, the inability to filter linked information parameters for process troubleshooting and defect identification, the inability to easily impart information back to the AOI system in real-time to update the AOI system's knowledge-base, and the lack of a dynamic link between information items in the user interface from one view area to another.

More specifically, the present invention provides a user interface method and system allowing for user selection on a display device of one or more functions performed via a computer in an automated optical inspection system. The user interface of the present invention provides a real-time information display for a supervising line operator so that he or she can readily observe critical board inspection information and potential undesirable operating conditions and rapidly initiate corrective action. The user interface includes one or more button icons respectively associated with the user selectable functions. The user interface also includes at least one view area window for displaying information items, wherein the information items displayed in the window are dynamically linked to one another to provide interactivity between windows and simultaneous updating of related information items in all views. A filter area window is provided for the user to select which information items to discriminate out and display in the view windows. The filter area window is operable to simultaneously update the information items displayed in each of the other windows in the user interface based on the discrimination criteria selected by the user in the filter area.

The AOI system user interface method and system of the present invention can be a graphical user interface having view windows in which either text, graphics or both are displayed simultaneously. The information items displayed in each of the windows can be interrelated such that, for example, if the information item in one window is a textual description of a board defect or properties of board defects, a corresponding information item in another view area window can be a graphical representation of that same defect. If a user selects a textual description of a defect, a graphical representation of the selected defect can be made to appear in a related window. Likewise, when a user selects a discrimination criteria in the filter area window, the data meeting the discrimination criteria can appear in either textual, graphical, or both formats in corresponding view windows. The automated optical inspection user interface method and system of the present invention can have multiple view area windows with multiple functions associated between them.

As a technical advantage, the automated optical inspection user interface and method of this invention provides a user interface for an automated optical inspection system that is both easy to use and provides the operator with the capability to impart defect classification information back into the automated optical inspection system.

A further technical advantage of the present invention is that it provides an automated optical inspection system user interface that dynamically links the information items displayed within different areas of the user interface such that a user can interact with information items in one view area and simultaneously link to and/or update the corresponding information items in another view area.

A still further technical advantage is that the AOI system user interface of this invention has the capability to discriminate ("filter") the type and amount of information displayed in the view areas of the user interface.

An even further technical advantage is that the AOI system user interface of this invention allows the user to train the AOI system in real-time, and without interruption of the inspection process, to increase the confidence level in the defect detection capability of the AOI system and to improve the AOI system's identification and classification of defects.

A further technical advantage of the AOI system user interface of the present invention is that the user can troubleshoot the AOI system process to determine the source of false calls and defect occurrences in the process without having to modify the entire inspection algorithm to reduce the scope of said inspection algorithm to a single component.

Yet another technical advantage of the AOI system user interface is the ability to present to the user a side-by-side visual comparison of a currently detected or identified board defect and a closest high-confidence defect match, or a visual example of what the component should look like, from the AOI systems knowledge-base to provide for a rapid and more reliable determination of the existence of a defect by a user.

Still a further technical advantage is the ability of the AOI system user interface of this invention to permit a user to quickly and accurately determine the source of process errors, thereby allowing economically feasible small production runs of different boards and/or components without the heavy reliance on process engineers (as in prior art systems).

An even further technical advantage is the ability of the AOI system user interface of this invention to provide access controls to protect sensitive menu items.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of various drawings.

The present invention addresses the problem of imparting information to an AOI system through the interacting behaviors of the different display view area elements of a main user interface. In one embodiment of the present invention, four main elements are provided for the main user interface; a graphical display area ("GDA"), a display list area ("DLA"), a numerical display area ("NDA"), and a filter area ("FA"). The interaction of these user interface elements allows the user to 1) determine the distribution of class memberships (i.e., the concentration of defects on a printed wiring board ("PWB")); 2) to specify the classes to view (i.e., show only the defective components); and 3) to view classifications by confidence value (a measure of the certainty of the classification).

Figure 1:
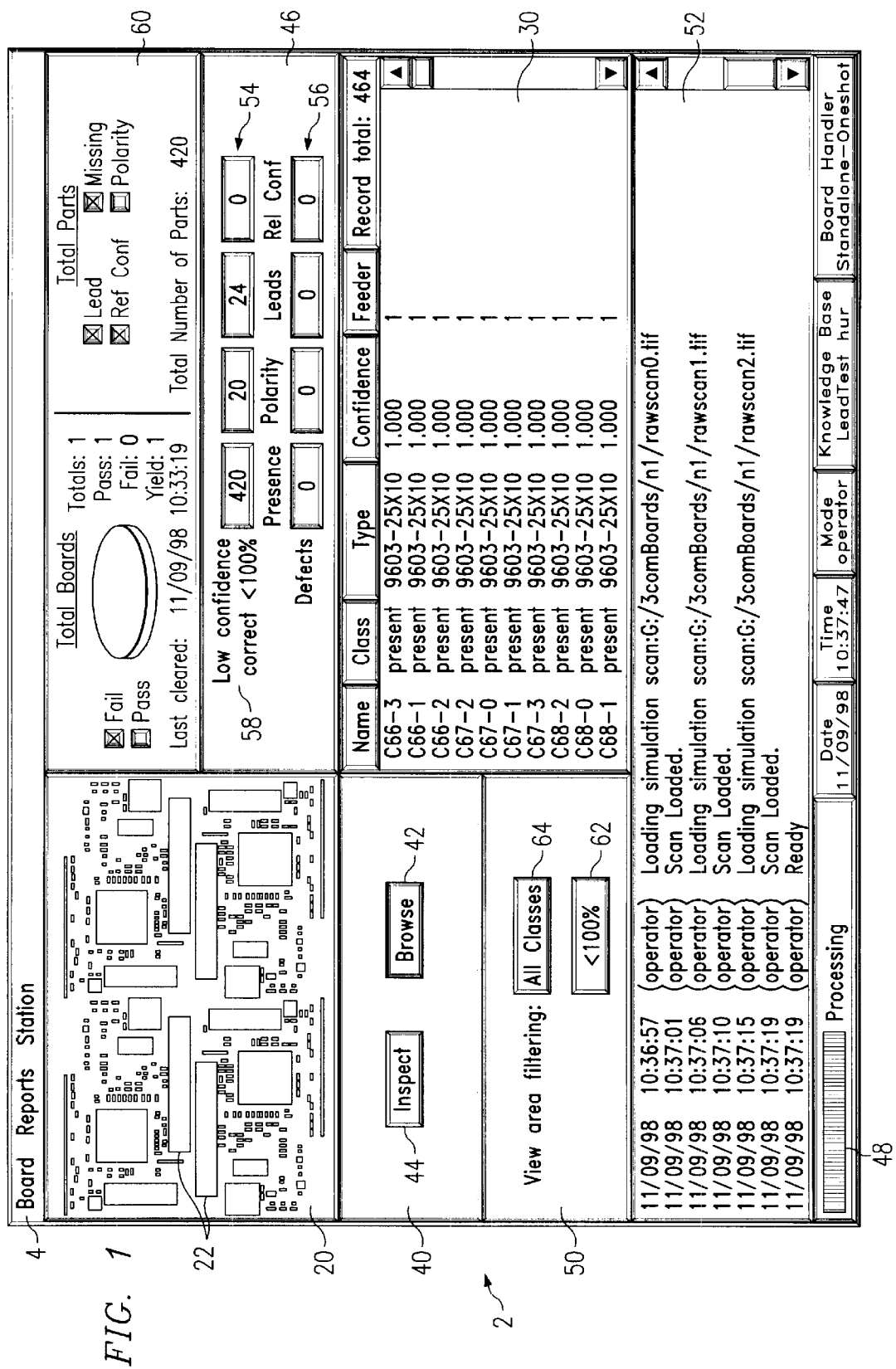
FIG. 1 shows a graphical embodiment of the AOI system user interface of this invention.
Figure 2:
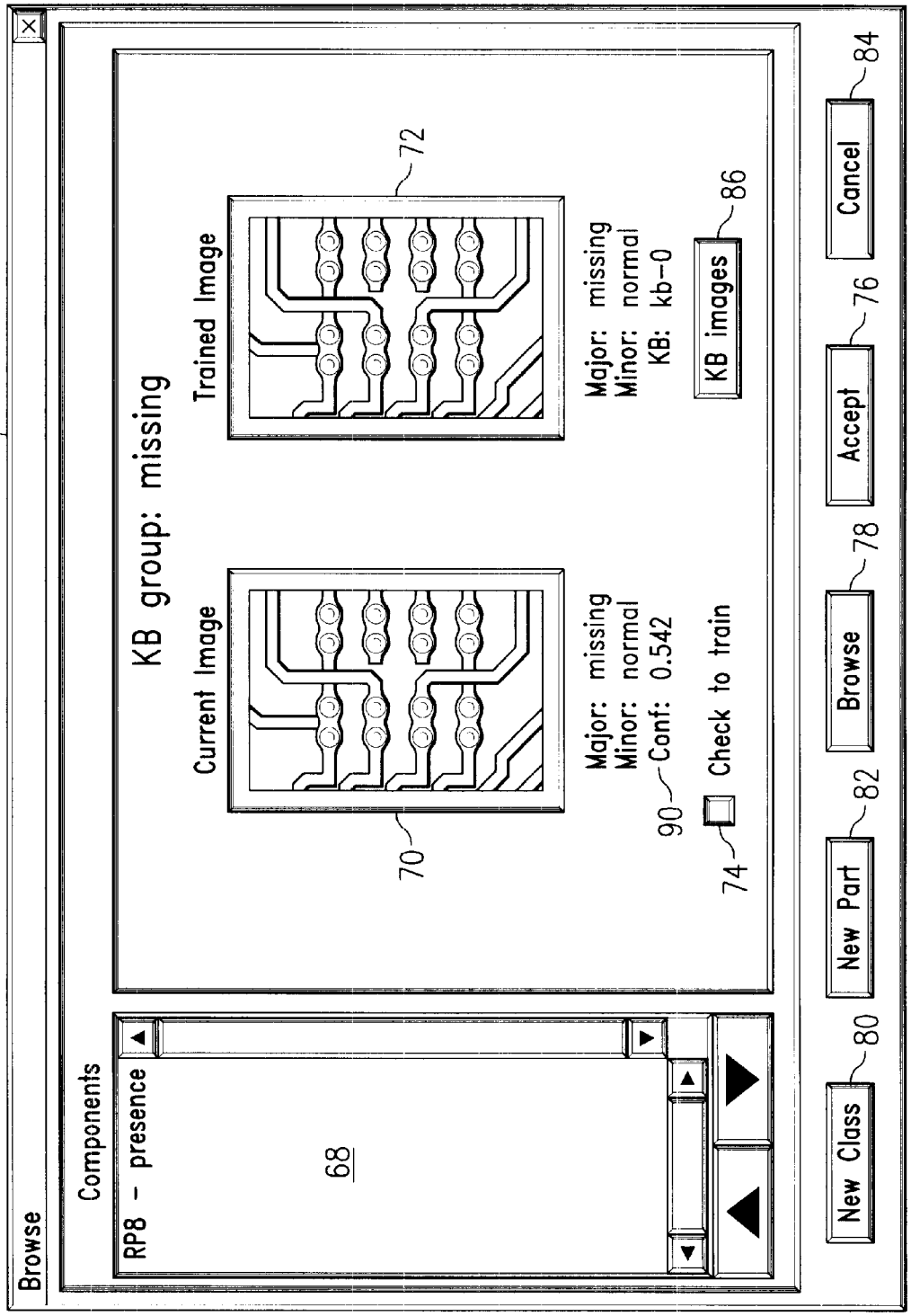
FIG. 2 shows a browse window of the graphical embodiment of the AOI system user interface of this invention shown in FIG. 1 that can be used for inputting information into the AOI system.

FIG. 1 shows one embodiment of the automated optical inspection user interface method and system of the present invention. In particular FIG. 1 shows a graphical embodiment of the user interface of this invention. Graphical user interface 2 includes graphical display area 20, filter area 50, display list area 30, and numerical display area ("NDA") 46. Graphical user interface 2 also includes menu bar 4, command button area 40 (that further includes inspect button 44 and browse button 42), and cumulative results area 60. Progress bar 48 displays the progress of the current function and status area 52 displays the past and present system status. If the user manipulates control elements in filter area 50, the corresponding elements in DLA 30, GDA 20, and NDA 46 can be simultaneously updated. Similarly, if the user selects an element in DLA 30, it can be highlighted in GDA 20. If the user selects a desired set of elements to view in detail, he or she can depress browse button 42 to bring up the window shown in FIG. 2. FIG. 2 is discussed more completely below.

The graphical embodiment of the AOI system user interface of this invention shown in FIG. 1 provides the ability to filter the information displayed in all of the display areas: GDA 20, FA 50, DLA 30, and NDA 46. Once the user has filtered the information provided down to a set of components that are interesting, for example, either because the system classified them correctly as having a defect or because the system classified them incorrectly, the user can train the system to increase system performance on those types of defects. This can be analogized to a funnel in which the AOI system starts off with a large number of components that are then paired down by the user using GUI 2, leaving the components that are interesting to the user. The user trains the AOI system to increase performance using the filtered information. If this process is subsequently repeated, a lesser amount of questionable information goes down to the bottom of the funnel.

One advantage of the user interface of this invention is that it allows the user to treat each component classification individually. The user is therefore able to focus on just those components that are classified as defective to rapidly correct the type of errors that the system may be making with respect to those components. The user can make the connection without affecting all the correctly classified component decisions, even those of the same part class (unlike prior art systems). The user can also select individual components.

The AOI system user interface of this invention allows the user to quickly determine, by means of GUI 2's filtering capability, which components are being either correctly or incorrectly identified as defective and also to very quickly correct the process to eliminate the component defects and/or mis-classifications. As shown in FIG. 1, GUI 2 allows the user to filter process data not only by part type or classification value, but also by the confidence value associated with a given classification. This allows the user to make a decision whether to more closely investigate a defect identification and classification by the AOI system. For example, the user can have the system show all classes that have a confidence value under 60%. These results can be displayed in display list area 30, numerical display area 46, and graphical display area 20.

Even though the AOI system may not have enough information to make a high-confidence decision on the defect classifications, the user can personally verify the system's classification, thereby increasing the current decision's confidence. As described below as part of FIG. 2, the user can also impart his or her high-confidence classification knowledge to the system, thereby providing the system the ability to make subsequent classifications with a higher level of confidence.

As shown in FIG. 2, The AOI system user interface of this invention allows the user, in a learning ("Browse") window to show both a current defect image and a comparison image from one or more defect classes stored in a knowledge-base within the AOI system. For example, in one embodiment of this invention, the user interface can show the closest example to the currently classified defect or show a known-good or known-bad image. The user can then easily determine whether the currently classified defect looks enough like a stored knowledge-base defect and decide whether the AOI system has correctly classified the current defect.

For example, if the AOI system is set to determine whether a component is present, the system could show the closest present image. In another embodiment, the system could show both the closest "present" image and the closest "missing" image. This allows the user to conceptualize these decisions and leaves less room for either an erroneous interpretation by the user or for disagreement among different users concerning the same classification. The user is left doing a simple selection task as opposed to a recognition task. The user does not have to pick out or recognize a defect from among all the different types of defects, but instead through a simple comparison can make a more subtle recognition of defects.

GUI 2 of FIG. 1 can present the user information on a given component, selected from, for example, display list area 30. If a user selects one of the components from filter area 50, the same component can be simultaneously highlighted in graphical display area 20, and in the current board results displayed in numerical display area 46, as shown in FIG. 1. In this embodiment, the information shown in display list area 30 reflects the setting of the filter area 50 and will not be updated if the user selects a line in display list area 30. Thus, GUI 2 permits the user to simultaneously view the identified component, the graphical display of the component on the current board itself.

It should be understood that more elaborate updates (as opposed to updates unilaterally driven by filter area 30 as discussed in FIG. 1), such as bidirectional updates, can be performed by the present invention. The user interface of this invention can operate with, preferably, an AOI system such as that disclosed in pending U.S. patent application Ser. No. 09/935,531, filed on Sep. 22, 1997, incorporated by reference herein in its entirety. In operation, such an AOI system has an algorithm that uses a knowledge-base of defects and non-defects against which to compare and classify current defects. This knowledge-base can be created when the AOI system is first trained and can be subsequently updated as defect data is acquired, for example, as described in U.S. patent application Ser. No. 09/636,004, entitled "System and Method For Dynamic Image Recognition," filed on Jul. 28, 1999, incorporated herein by reference in its entirety. As will be explained below in relation to browse button 42, the knowledge-base can be updated through the learning "characteristics" or "features" of the user interface of this invention.

When a new board is inspected using the AOI system, GUI 2 of FIG. 1 can be updated as the board is inspected. The AOI system inspects the current board and creates classification values for all of the components on the board by referencing the knowledge-base, and then displays the results via GUI 2. The AOI system takes an image of the board when it is inspected and runs it through the knowledge-base to create classification decisions. The resulting decisions are written to a results database. The results database is what is referenced by the user interface when going through the filtering process of this invention.

The image of the current board is compared to the knowledge-base to get classifications, confidence values, etc., and the results database stores the result of this process. Filtering operations and other operations controlled via GUI 2 of FIG. 1 involve only the results database of the current board image until, as discussed below, the browse function is activated and the user imparts information to the AOI system via the learning function of the underlying AOI algorithm. However, information that can be provided to the knowledge-base by either the user or the AOI system need not come from the results database of the current image, but can be information provided by other aspects of the AOI system. Once incorporated into the knowledge-base, the information becomes a part of the knowledge-base against which any future board images can be compared. Typically, the user can filter information based on discrimination criteria of his or her choosing and then go to the browse section of GUI 2 to impart the new knowledge into the knowledge-base of the AOI system.

FIG. 1 shows the displayed results of an AOI system inspection process for a current board which has been inspected, had an image created, and had the image run through the knowledge-base to create a results database. The results database can be displayed in GUI 2 in various ways. For example, in graphical display area 20, each of the board components can be color-coded. If the board is being inspected for presence or absence of a component, a component can be shown as green if present and red if missing. Similarly, if inspecting for polarity, the correct polarity can be one color and the wrong polarity a different color. If the AOI system is inspecting leads, missing defective leads can be shown by displaying the component in one color and present or non-defective leads by displaying in a different color.

Color-coding allows a user to visually detect the presence or absence of defects very quickly, and to do so from a distance. The user can thus quickly determine where in the assembly process defects are occurring and can initiate corrective action(s) to the appropriate step(s) in the assembly process.

GUI 2 also allows the user, via graphical display area 20, to select optional bar code area 22. If bar code area 22 is selected, GUI 2 can interpret the bar code and display the information encoded on the current board's bar code area 22 (and can optionally display the bar code in status area 52). The information derived from bar code area 22 can be incorporated into the current board's results database. GUI 2 allows the user to track and incorporate into the results database those defects found during inspection automatically as part of the AOI process. GUI 2 of this invention thus provides for integrated bar code reading on boards under inspection, eliminating the need for manual bar code readers and manual bar code reader operators.

Display list area 30 can provide a sortable textual and numerical listing of component names, the classification value of each component, the type of component, the confidence value assigned to a defect classification, and the feeder from which the component came (if available). The information in display list area 30 can be obtained from the results database. Display list area 30 can also display a reference number for each component that indicates where on the board the component is located.

Display list area 30 is dynamically linked to filter area 50 and, together with filter area 50, allows a user to discriminate the displayed data based on various criteria. For example, graphical display area 20 can depict the inspection results for the board under inspection but may not necessarily indicate the component type for any defective components. For example, GDA 20 can provide a color-coded spatial view of detected defects, as discussed above, so that the user can easily tell if defects exists, but the user cannot determine individual component types from the color-coded view.

Display list area 30, by contrast, allows the user to see which components come from a particular feeder, which are of a particular type, etc. Using filter area 50, numerical display area 46, and display list area 30, the user can discriminate based on any of the categories shown in upper bar 54 of numerical display area 46. The categories shown in upper bar 54 are representative only and can be modified for a given application.

Numerical view area 46 permits the user to change the point of view of the information presented on GUI 2. For example, in FIG. 1, upper bar 54 shows 420 components being inspected for presence, (i.e., whether the component is present or absent). Lower bar 56 shows, under the "presence" box, that there are zero presence defects among those 420 components. Similarly, upper bar 54 shows there are 20 components inspected for polarity and 24 components inspected for leads. Each of these has correspondingly zero defects noted in the boxes of lower bar 56.

Upper bar 54 shows the type of defects being looked for on a particular board, (i.e., the number of components a given test is being performed on), and lower bar 56 shows the number of components that have failed that test. Box area 58 shows the low confidence correct setting, here set at less than 100 percent. Box area 58 is tied to the filtering function of filter area 50. If confidence value 62 in filter area 50 is changed by the user, the low confidence correct number in box area 58 is simultaneously updated. Numerical view 46 therefore tells the user that the results displayed are for defect classifications having a confidence value less than the setting shown in confidence value 62 and box area 58.

Display list area 30 and graphical display area 20 can be similarly tied to confidence value 62 of filter area 50. The components displayed in GDA 20 and DLA 30 are only those components that meet that confidence level criteria set at confidence value 62. For example, if confidence value 62 is set to less than 70%, those components that have a confidence value greater than 70% will be filled with color in graphical display area 20, in display list area 30, or be counted in numerical display area 46.

Filter area 50 thus can tie into all of the other view areas shown in GUI 2 of FIG. 1. Filter area 50 can further have pull-down menus for confidence values 62 and classification value 64. Similarly, the filtering criteria shown in filter area 50 of FIG. 1 are representative only. For example, FIG. 1 shows classification value 64 as all classes, but it can instead show all components that are present, or that are of a different polarity. Also, the classifications themselves can have subclasses. The AOI system user interface of this invention can therefore potentially discriminate based on any defect classification that can be determined by the system.

Typically, filter area 50 is set to show all defects less than 100% because this will display for the user all defects associated with the inspected board. This way, the user can quickly check the process on one line even though he or she may be monitoring multiple machines. The user can also quickly and with high-confidence determine process status by viewing GUI 2.

For example, if filter area 50 is set to show all defects with a confidence level less than 100% and nothing is shown in graphical display area 20, the user can quickly look up, determine there is nothing in graphical display area 20, and that therefore there are no detected defects on the current board. Display list area 30 can also be colored green if no defects are found, or red if defects are found. Similarly, GUI 2 could include an audio interface that produced an audio alarm, or other feedback method, if defects are discovered. The user can verify the defects and then move on to the next board. Alternatively, the machine can automatically move on to the next board unless told otherwise by the user.

GUI 2 allows even further discrimination by allowing the user to set a test, such as polarity, and set confidence value 62. GUI 2 therefore allows the user to filter out the background of all the good classifications (i.e., the non-defective parts), and determine by filtering down to a particular type of defect where in the production process the defects are occurring.

Using GUI 2 of this invention, the user can quickly troubleshoot a problem in the production line to a particular production process step, a particular component, or a particular location. The heavy reliance of current AOI systems on process engineers is therefore reduced. Similarly, the heavy reliance of current AOI systems on lengthy process runs required to manually program component defect detection algorithms, or to adjust algorithm threshold values, is also reduced. Using the AOI system user interface of this invention, short production runs can be made cost effective because troubleshooting a defect in the line can be reduced from a matter of minutes or hours to a matter of seconds. Furthermore, the troubleshooting can be done by a line operator instead of a process engineer, thus empowering line personnel to make these decisions. Line shutdown times can therefore also be reduced.

GUI 2, and the dynamic interrelations between the view areas and filter area 50, provide a typical line operator with the type of data necessary to diagnose a line problem quickly and effectively. Filtering area 50 provides the user, via the underlying programming of the interface, a link between confidence value 62 and classification value 64 that determines the information displayed in each of the other view areas. In the embodiment of the AOI user interface of this invention shown in FIG. 1, numerical display area 46 is connected to confidence value 62 of filter area 50. Similarly, display list area 30 and graphical display area 20 are linked to both confidence value 62 and classification value 64 of filter area 50.

Thus, for example, if confidence value 62 is set to 70% or less and classification value 64 is set to only missing components, both display list area 30 and graphical display list area 20 will only show missing components under 70% confidence level. Numerical display 46 however, will update the upper bar 54 to show all classifications test results with confidence values under 70%. Thus, in FIG. 1, the presence box in upper bar 54 may drop from 420 to 0 because all the parts were classified present with a confidence level of 70% or higher.

A further advantage of GUI 2 of this invention is that display list area 30 components can be linked to graphical display area 20 such that if the user highlights a component in display list area 30, a pointer can appear in graphical display area 20 to indicated the highlighted component. In this way, reference numbers for components on a board are easy to determine by the operator, saving time and cost. Alternatively, if a component in display list area 30 is selected, GUI 2 can show an actual image of the component in graphical display area 20 along with the textual information shown in display list area 30.

When selected by the user, browse button 42 of FIG. 1 brings up browse window 100 of GUI 2 as shown in FIG. 2. Browse window 100 is associated with the learning functionality of the underlying AOI system to which GUI 2 interfaces.

Browse window 100 can be accessed by the user via browse button 42 to impart new knowledge to the AOI system knowledge-base. For example, if after filtering a current board results database only five components meet the filtering criteria selected by the user, the user could select one or more of those components and go to the browse function. In the example shown in FIG. 2, only one component is shown in component section 68. In practice, however, the list of components under components section 68 can contain all of the elements selected by the user from the board results database. The browse function of the underlying AOI system as implemented in GUI 2 takes information only as filtered based on the user set discriminants.

The example shown in FIG. 2 is a missing defect for the component shown in components section 68. The confidence level associated with the current defect is shown in confidence box 90 of current image 70. Through browse window 100, the user can improve the decision making capability of the AOI system by training the knowledge-base with new user corroborated information. The user can for example, fill in check to train box 74. If the user wants the AOI system to treat this defect like any other normal missing defect, he or she can select accept button 76. The AOI system will now treat the current image 70 as a normal missing defect.

Trained image 72 of FIG. 2 is the image contained in the knowledge-base that is closest to current image 70. The AOI system knowledge-base itself has more than one image of the same component and can have more than one image of a defect classification. For example, if there were five trained images corresponding to the current image defect, the closest one would be displayed as trained image 72. Conversely, the user could choose to look at all of the corresponding trained images by pressing browse button 78 of FIG. 2.

Browse button 78 allows the user to browse the knowledge-base for the trained images of the component depicted in current image 70. The user can go into the AOI system knowledge-base and compare, add, or delete images. The images that can be accessed from browse window 100 are accessed from the knowledge-base, but the underlying AOI system software compares image descriptors, as disclosed in pending U.S. patent application Ser. No. 09/935,531, filed on Sep. 22, 1997, and not the images themselves. The images are kept simply for this visual comparison that can be made by the user.

Once the user has added knowledge to the AOI system knowledge-base through browse window 100, the knowledge-base is updated for any future boards that are inspected. The system can learn and grow as defects are classified and corroborated by the user via GUI 2. As a result, confidence levels in decisions made by the machine itself will eventually increase such that the decision making process requires less user interaction.

The same learning process as depicted in FIG. 2 is also used in the AOI system approach to correcting false alarms and false accepts of the AIMS system manufactured by Intelligent Reasoning Systems, Inc. of Austin, Tex., and disclosed in pending U.S. patent application Ser. No. 09/935,531, filed on Sep. 22, 1997, hereby incorporated by reference in its entirety. FIG. 2, for example, could have been a false alarm (rather than simply an example of increasing a confidence answer).

Component list 68 lists the components being browsed. If there are several low confidence or defective components, they can all be easily browsed by selecting each in succession from component list 68. Components can be listed once per defect classification, possibly being listed as many times as there are defect classes. For example, components can be listed once to view their defects based on the presence/absence classification task, and once based on the correct polarity/wrong polarity classification task.

Check-to-train box 74 is selected when the user wishes to add current image 70 to the knowledge-base to increase the confidence in the decision made, or to change the classification made by the AOI system in the case of a false alarm or false accept. KB images button 86 allows the user to select images in the knowledge-base corresponding to a defect classification that might be more applicable (i.e., a wrong answer or false alarm).

New class button 80 permits the user to define the target image as an example of a new class of defect if current image 70 exhibits a defect that is not currently in the knowledge-base. By selecting new class button 80, a secondary dialogue box (not shown) appears and asks the user to enter a name for the new class of defect. Current image 70 is processed and entered into the knowledge-base as an example of the new class of defects, which can then be tracked on future inspections.

Using new part button 82, the user can add a previously unseen part (e.g., from a new vendor), into the AOI knowledge-base. Selecting new part button 82 results in yet another secondary dialogue box appearing (not shown). The user is asked to enter a designator for the new part (typically a vendor name or other visual designation). Current image 70 is processed and entered into the knowledge-base as an example of the new part type.

Browse button 78 further allows the entire portion of the knowledge-base associated with the target part type to be viewed as a series of thumbnail images. This is most useful in determining if erroneous information has been added into the knowledge-base. If erroneous information has been added, the information can be deleted by deleting the corresponding thumbnail image. Accept button 76 is used to accept the input made by the user, and cancel button 84 discards all user supplied information and returns to the view shown in FIG. 1.

A principle aspect of the AOI system user interface of the present invention in browse window 100 of FIG. 2 is the presentation of current image 70 in conjunction with a view of trained image 72, which is determined to be closest in appearance to current image 70. Browse window 100 can also include a view of the image that is the closest opposite of trained image 72 so that the user can see the full distinction between the classification options. For example, in FIG. 2, current image 70 is of the class missing and trained image 72 is also of that class. The opposite image that can be displayed in a third image pane (not shown) is the present class. The idea of displaying for the user the current image and the options for the classification being made is a central point of the AOI system user interface of this invention. The user is asked to make an inspection decision (i.e., is the current image correctly classified or not?) instead of being asked to modify a program (e.g., a threshold value or algorithm selection or parameters).

Another unique aspect of the AOI user interface of the present invention is a wizard-like method for training a new board inspection process. This method for training a new board inspection process is possible because of the underlying learning functionality of the algorithms associated with an AOI system such as that disclosed in pending U.S. patent application Ser. No. 09/935,531, filed on Sep. 22, 1997. The wizard-like method of training is essentially a step-by-step guided process via the user interface for the user to input new boards and new classifications into the system.

The wizard allows the user to very quickly go through the training process and allows the user to look through the sequence of components to ensure that all of the components and their particular requirements are entered into the system. The user can then check the training images to ensure they are correct. Additionally, the training wizard allows the user to train a new board product while another board product is being produced on a production line. This saves time and increases efficiency.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A user interface providing for user selection on a display device of one or more functions performed via a computer, comprising:

one or more button icons respectively associated with said one or more user selectable functions;

a plurality of view area windows for displaying one or more information items associated with one or more components, wherein said one or more information items in each of the plurality of view area windows is dynamically linked to a corresponding one of the one or more information items in another one of the plurality of view area windows; and a filter area window for discriminating out which ones of the one or more information items are displayed on said plurality of view area windows and operable to simultaneously update said displayed one or more information items in each of said plurality of view area windows, wherein the filter area window further contains a plurality of discrimination criteria for selection of information items, and the user interface is operable to update said displayed one or more information items in response to specification of one or more of the plurality of discrimination criteria.

2. The user interface of claim 1, wherein the user interface allows a user to analyze a defect via a comparison of an image of the defect to one or more other images.

3. The user interface of claim 1, wherein the user interface is a graphical user interface.

4. The user interface of claim 3, wherein said plurality of view area windows comprise a data list window for listing at least one of said one or more information items, a graphical display window for displaying a linked image of one or more of said one or more components, and a numerical display window to display quantitative result information and a filter area window for displaying filtering criteria.

5. The user interface of claim 4, wherein said at least one or more information items comprise a component name, classification value, component type, confidence value, feeder identification, and reference number.

6. The user interface of claim 4, wherein said one or more components can be color coded within said graphical display window to indicate presence or absence of a defect.

7. The user interface of claim 1, further comprising a setup wizard for guiding the user through the initial training of the automated optical inspection system.

8. The user interface of claim 1, further comprising:

a cursor that can be positioned by a user on said one or more button icons to select one of said one or more functions; and a display controller responsive to the positioning of said cursor by said user.

9. The user interface of claim 1, wherein said filter area window further comprises at least one category area for selecting discrimination criteria and one confidence interval selection area.

10. The user interface of claim 9, wherein said at least one category area further comprises at least one decision class and wherein said confidence interval comprises at least one confidence value or range of confidence values.

11. The user interface of claim 1, further comprising a browse window, accessed via a browse button, for the user to impart information to an automated optical inspection system to increase detection and classification accuracy.

12. The user interface of claim 11, wherein the automated optical inspection system further comprises a knowledge-base for storing the user imparted information.

13. The user interface of claim 12, wherein the information imparted to said knowledge-base is from a results database of information derived from an image of an inspected one of said one or more components.

14. The user interface of claim 1, wherein the one or more components are installed on a printed wiring board.

15. The user interface of claim 14, wherein said one or more functions include a function for automatically interpreting and displaying information stored on a bar code on said printed wiring board, and further connecting said information to a set of results for said printed wiring board.

16. The user interface of claim 1, further comprising an audio interface for alerting the user of a defect.

17. The user interface of claim 1, wherein said one or more information items are charts or graphs.

18. The user interface of claim 1, further comprising a single view area window.

19. A method for performing one or more functions via a computer user interface, comprising:
- displaying one or more button icons respectively associated with said one or more functions;
- displaying a plurality of view area windows containing one or more information items associated with one or more components, wherein said one or more information items in each of the plurality of view area windows is dynamically linked to a corresponding one of the one or more information items in another one of the plurality of view area windows;
- displaying a filter area window for discriminating out which ones of the one or more information items are displayed on said plurality of view area windows and operable to simultaneously update said displayed one or more information items in each of said plurality of view area windows, wherein the filter area window further contains a plurality of discrimination criteria for selection of information items, and the user interface is operable to update said displayed one or more information items in response to specification of one or more of the plurality of discrimination criteria; and
- performing one of said one or more functions by selecting one of said one or more button icons respectively associated with said one or more functions.

20. The method of claim 19, further comprising analyzing an image by comparing the image to an alternative image contained in a database.

21. The method of claim 19, wherein said plurality of view area windows comprise a data list window for listing at least one of said one or more information items, a graphical display window for displaying a linked image of one or more of said one or more components, and a filtering display window for displaying filtering criteria and a numerical display window for displaying results, and wherein said at least one or more information items comprise a component name, classification value, component type, confidence value, feeder identification, and reference number.

22. The method of claim 21, further comprising the step of color-coding said one or more components within said graphical display window to indicate presence or absence of a defect.

23. The method of claim 19, further comprising the step of guiding a user through the initial training of the automated optical inspection system using a setup wizard.

24. The method of claim 19, wherein said performing step is performed by a user.

25. The method of claim 19, wherein said performing step further comprises selecting one of said one or more button icons respectively associated with said one or more functions by positioning a cursor on said one of said one or more button icons using a display controller responsive to the positioning of said cursor by a user.

26. The method of claim 19, wherein said filter area window further comprises at least one category area for selecting discrimination criteria and one confidence interval selection area.

27. The method of claim 26, wherein said at least one category area further comprises at least one decision class and wherein said confidence interval area comprises a confidence value or a range of confidence values.

28. The method of claim 19, further comprising the step of inputting information to the automated optical inspection system to increase detection and classification accuracy using a browse window accessed via a browse button on said user interface.

29. The method of claim 28, further comprising storing the inputted information in a knowledge-base for the automated optical inspection system.

30. The method of claim 29, further comprising the step of modifying a results database to contain said inputted information from an image of an inspected one of said one or more components.

31. The method of claim 19, wherein the one or more components are installed on a printed wiring board.

32. The method of claim 31, wherein said one or more functions include a function for automatically interpreting and displaying information stored on a bar code on said printed wiring board, and further connecting said information to a set of data results for said printed wiring board.

33. The method of claim 19, further comprising displaying a single view area window.

34. In an automated optical inspection system, a user interface providing for user selection on a display device of one or more functions performed via a computer, comprising:
- one or more button icons respectively associated with said one or more user selectable functions;
- a plurality of view area windows for displaying one or more information items associated with one or more components, wherein said one or more information items in each of the plurality of view area windows is dynamically linked to a corresponding one of the one or more information items in another one of the plurality of view area windows; and
- a filter area window for discriminating out which ones of the one or more information items are displayed on said plurality of view area windows and operable to simultaneously update said displayed one or more information items in each of said plurality of view area windows, wherein the filter area window further contains a plurality of discrimination criteria for selection of information items, and the user interface is operable to update said displayed one or more information items in response to specification of one or more of the plurality of discrimination criteria.

35. A method for training a system to perform a task using a computer user interface, comprising:
- displaying one or more button icons respectively associated with said one or more functions;
- displaying a plurality of view area windows containing one or more information items associated with one or more components, wherein said one or more information items in each of the plurality of view area windows is dynamically linked to a corresponding one of the one or more information items in another one of the plurality of view area windows;
- displaying a filter area window for discriminating out which ones of the one or more information items are displayed on said plurality of view area windows and operable to simultaneously update said displayed one or more information items in each of said plurality of view area windows, wherein the filter area window further contains a plurality of discrimination criteria for selection of information items, and the user interface is operable to update said displayed one or more information items in response to specification of one or more of the plurality of discrimination criteria; and performing one of said one or more functions by selecting one of said one or more button icons respectively associated with said one or more functions.

36. The method of claim 35, wherein the task is an inspection of printed wiring assemblies.

37. The method of claim 36, wherein using the computer user interface effectively programs the system regarding the inspection task.

38. The method of claim 35, further comprising analyzing an image by comparing the image to an alternative image contained in a database.

39. The method of claim 35, wherein said plurality of view area windows comprise a data list window for listing at least one of said one or more information items, a graphical display window for displaying a linked image of one or more of said one or more components, and a filtering display window for displaying filtering criteria and a numerical display window for displaying results, and wherein said at least one or more information items comprise a component name, classification value, component type, confidence value, feeder identification, and reference number.

40. The method of claim 35, wherein said performing step is performed by a user.

41. The user interface of claim 1, wherein said user interface comprises a user interface to an automated optical inspection system.

42. The user interface of claim 1, wherein one or more of said one or more dynamically linked information items comprises a user-selectable information item.

43. The user interface of claim 42, wherein selecting one of said user-selectable information items in one of said plurality of view area windows highlights another of said user-selectable information items in another of said plurality of view area windows.

44. The user interface of claim 42, wherein one or more of said user-selectable information items further comprise a user-modifiable information item.

45. The user interface of claim 44, wherein modifying one of said user-modifiable information items in one of said plurality of view area windows modifies an associated other of said user-modifiable information items in another of said plurality of view area windows.

46. The user interface of claim 42, wherein one or more of said user-selectable information items in one of said plurality of view area windows has an associated user-selectable information item in another of said plurality of view area windows.

47. The user interface of claim 42, wherein said highlighted user-selectable information item shares a common criteria with said selected user-selectable information item.

48. The user interface of claim 47, wherein said common criteria is an association with one of said components.

49. The user interface of claim 1, wherein said filter area window is dynamically-linked to one or more of said plurality of view area windows, wherein being dynamically-linked comprises an interactive relationship for simultaneous updating of related others of said information-items in response to a change in one of said information items.

50. An automated optical inspection system user interface for user selection on a display device of one or more functions performed via a computer, comprising:

one or more button icons respectively associated with said one or more user selectable functions;

a plurality of dynamically linked view area windows for displaying one or more information items associated with one or more components, wherein said one or more information items in each of the plurality of dynamically linked view area windows is associated with another of said one or more information items in another one of said plurality of view area windows; and a filter area window for discriminating out which ones of the one or more information items are displayed on said plurality of dynamically linked view area windows, said filter area window being dynamically linked to one or more of said plurality of dynamically linked view area windows and operable to simultaneously update said displayed one or more information items in each of said plurality of view area windows, wherein the filter area window further contains a plurality of discrimination criteria for selection of information items, and the user interface is operable to update said displayed one or more information items in response to specification of one or more of the plurality of discrimination criteria.

51. The user interface of claim 50, wherein said dynamically linked view area windows are operable to display a current image of a defect and one or more comparison images for a user to compare said defect to said comparison images.

52. The user interface of claim 50, wherein the user interface is a graphical user interface.

53. The user interface of claim 52, wherein said plurality of dynamically linked view area windows comprise a data list window for listing at least one of said one or more information items, a graphical display window for displaying a linked image of one or more of said one or more components, and a numerical display window to display quantitative result information and a filter area window for displaying filtering criteria.

54. The user interface of claim 53, wherein said at least one or more information items comprise a component name, classification value, component type, confidence value, feeder identification, and reference number.

55. The user interface of claim 53, wherein said one or more components can be color coded within said graphical display window to indicate presence or absence of a defect.

56. The user interface of claim 50, further comprising a setup wizard for guiding the user through an initial training of said automated optical inspection system.

57. The user interface of claim 50, further comprising:

a cursor that can be positioned by a user on said one or more button icons to select one of said one or more functions; and a display controller responsive to the positioning of said cursor by said user.

58. The user interface of claim 50, wherein said filter area window further comprises at least one category area for selecting discrimination criteria and one confidence interval selection area.

59. The user interface of claim 58, wherein said at least one category area further comprises at least one decision class and wherein said confidence interval comprises at least one confidence value or range of confidence values.

60. The user interface of claim 50, further comprising a browse window, accessed via a browse button, for a user to impart information to an automated optical inspection system to increase detection or classification accuracy.

61. The user interface of claim 60, wherein the automated optical inspection system further comprises a knowledgebase for storing said user-imparted information.

62. The user interface of claim 61, wherein said user-imparted information is derived from a results database of information derived from an image of an inspected one of said one or more components.

63. The user interface of claim 50, wherein the one or more components are installed on a printed wiring board.

64. The user interface of claim 63, wherein said one or more functions include a function for automatically interpreting and displaying information stored on a bar code on said printed wiring board, and further connecting said information to a set of results for said printed wiring board.

65. The method of claim 19, wherein said user interface comprises a user interface to an automated optical inspection system.

66. The method of claim 19, wherein one or more of said one or more dynamically linked information items comprises a user-selectable information item.

67. The method of claim 66, wherein selecting one of said user-selectable information items in one of said plurality of view area windows highlights another of said user-selectable information items in an other of said plurality of view area windows.

68. The method of claim 66, wherein one or more of said user-selectable information items further comprise a user-modifiable information item.

69. The method of claim 68, wherein modifying one of said user-modifiable information items in one of said plurality of view area windows modifies an associated other of said user-modifiable information items in another of said plurality of view area windows.

70. The method of claim 66, wherein one or more of said user-selectable information items in one of said plurality of view area windows has an associated user-selectable information item in another of said plurality of view area windows.

71. The method of claim 67, wherein said highlighted user-selectable information item shares a common criteria with said selected user-selectable information item.

72. The method of claim 71, wherein said common criteria is an association with one of said components.

73. The method of claim 19, wherein said filter area window is dynamically-linked to one or more of said plurality of view area windows, wherein being dynamically-linked comprises an interactive relationship for simultaneous updating of related others of said information-items in response to a change in one of said information items.

74. The method of claim 19, wherein said one or more functions comprises analyzing an image by comparing said image to a comparison image stored in a database.

75. The user interface of claim 1, wherein the discrimination criteria include one or more of the group consisting of: defect type; component type; test type; confidence level; component presence; component polarity; and component leads.

76. The user interface of claim 19, wherein the discrimination criteria include one or more of the group consisting of: defect type; component type; test type; confidence level; component presence; component polarity; and component leads.

77. The user interface of claim 34, wherein the discrimination criteria include one or more of the group consisting of: defect type; component type; test type; confidence level; component presence; component polarity; and component leads.

78. The method of claim 35, wherein the discrimination criteria include one or more of the group consisting of: defect type; component type; test type; confidence level; component presence; component polarity; and component leads.

79. The automated optical inspection system user interface of claim 50, wherein the discrimination criteria include one or more of the group consisting of: defect type; component type; test type; confidence level; component presence; component polarity; and component leads.

* * * * *